H. Callahan,

Bucket Ear

No. 3,658. Reissued Oct. 5. 1869.

Witnesses.

Chas. H. Poole

C. A. Harkness

Inventor.

Ruse Callahan & co assnes of

Henry Callahan By his att, R D Asmith

N. PETERS, PHOTO-LITHOGRAPHER, WASHINGTON, D. C.

UNITED STATES PATENT OFFICE.

HENRY CALLAHAN, JOHN REESE, AND R. S. HOGLEN, OF DAYTON, OHIO, ASSIGNEES, BY MESNE ASSIGNMENTS, OF HENRY CALLAHAN.

IMPROVEMENT IN BUCKET-EARS.

Specification forming part of Letters Patent No. 64,484, dated May 7, 1867; Reissue No. 3,658, dated October 5, 1869.

*To all whom it may concern:*

Be it known that HENRY CALLAHAN, of Dayton, in the county of Montgomery and State of Ohio, did invent a new and useful Improvement in Bucket-Ears; and we do hereby declare the following to be a full, clear, and exact description of the same, reference being had to the accompanying drawings, in which—

Figure 1:
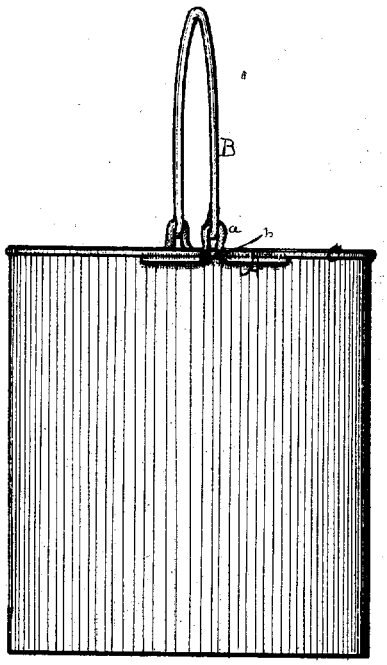
Figure 2:
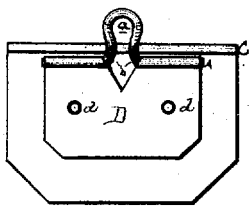
Figure 4:
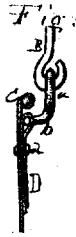
Figure 5:
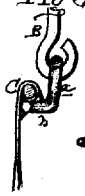
Figure 3:
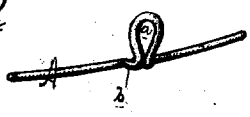

Figure 1 is a perspective view of this invention attached to a tin vessel. Fig. 2 represents the same as attached to a vessel of sheet-iron. Fig. 3 is a perspective view of this invention detached; Figs. 4 and 5, sectional elevations showing more perfectly the different modes of attachment.

Heretofore the ears of metal buckets have been made by forming loops in the rim-wire at such distances apart that when said wire is placed in position the loops will be at opposite sides of the vessel, or plates of thick metal stamped and perforated and secured either by solder or rivets have been used. These methods are both troublesome and expensive.

This invention, therefore, consists in forming bucket-ears of wire separate from the vessel to which they are to be attached, and as a distinct article of manufacture.

To enable others skilled in the art to make and use the invention, we will proceed to describe its construction and operation.

A piece of wire, A, of proper length, is formed into a loop, *a*, at its middle portion. The two parts of the wire next adjoining the loop *a* are then bent backward together, so as to form a short neck, *b*, and are then separated laterally until they are in position to conform to the side of a vessel to which the ear is to be attached. The hook at the end of the bail B passes through the loop *a*, as shown in the figures. When it is attached to a vessel constructed of tin or other metal with which tinners' solder will unite, it is then preferably soldered in place, as shown in Fig. 1. The parts of the wire A on each side of the neck *b* are then placed directly beneath the rim-wire C, and the solder flows above and below the ear-wire and between the rim *c* and neck *b*, uniting it with the utmost firmness to the rim and to the side of the vessel below in a manner which secures the utmost strength and permanency which the materials are capable of. The neck *b* thus forms as it were a hook engaging under the rim-wire and firmly united with it.

When the vessel is made of material, as sheet-iron, to which it is not convenient to solder the ear, it may be united thereto by means of a piece, D, of sheet-iron with a hole or slot in the middle through which the loop *a* projects. The parts of said piece D on either side of the ear-wire A are folded together, so that the rivets *d d* will pass through the thickness of the piece D and through the side of the vessel, as shown in Figs. 2 and 4. The neck *b* is necessary on pails which are designed to have covers or lids, so as to permit the bail or handle to pass over the edge of said cover.

Having described this invention, what we claim as new is—

A wire bucket-ear constructed separate from the vessel to which it is to be attached, substantially as described.

HENRY CALLAHAN.
JOHN REESE.
R. S. HOGLEN.

Witnesses for Callahan:
R. D. O. SMITH,
C. A. HARKNESS.

Witnessess as to Reese and Hoglen:
WILLIAM CRAIGHEAD,
QUINCY CORWIN.